(12) United States Patent
Stephens et al.

(10) Patent No.: US 8,430,450 B2
(45) Date of Patent: Apr. 30, 2013

(54) WORK MACHINE WITH DOOR-MOUNTABLE FRESH AIR FILTER

(75) Inventors: Joshua J. Stephens, Cuba City, WI (US); Bobby G. Martin, Dubuque, IA (US); Thomas A. Knopp, Asbury, IA (US); Richard L. Forest, Colona, IL (US)

(73) Assignee: Deere & Company, Moline, IL (US)

(*) Notice: Subject to any disclaimer, the term of this patent is extended or adjusted under 35 U.S.C. 154(b) by 47 days.

(21) Appl. No.: 13/059,530

(22) PCT Filed: Aug. 20, 2008

(86) PCT No.: PCT/US2008/073685
§ 371 (c)(1),
(2), (4) Date: Feb. 17, 2011

(87) PCT Pub. No.: WO2010/021620
PCT Pub. Date: Feb. 25, 2010

(65) Prior Publication Data
US 2011/0133513 A1    Jun. 9, 2011

(51) Int. Cl.
*B60H 3/06* (2006.01)
*B60H 1/26* (2006.01)
*B62D 33/06* (2006.01)

(52) U.S. Cl.
USPC ............... 296/190.09; 296/190.1; 55/385.3; 454/158

(58) Field of Classification Search ............ 296/190.09, 296/190.1, 190.11; 55/385.3; 454/158
See application file for complete search history.

(56) References Cited

U.S. PATENT DOCUMENTS

| | | | | |
|---|---|---|---|---|
| 3,868,896 A * | 3/1975 | Doll et al. | ............... | 454/137 |
| 4,415,052 A * | 11/1983 | Gauer | ............... | 180/69.2 |
| 4,514,201 A * | 4/1985 | Brown | ............... | 55/385.3 |
| 4,989,500 A * | 2/1991 | Anliker et al. | ............... | 454/158 |
| 5,076,637 A * | 12/1991 | Larkin et al. | ............... | 296/190.1 |
| 5,833,528 A * | 11/1998 | Baum et al. | ............... | 454/151 |
| 5,873,612 A * | 2/1999 | Connor | ............... | 292/338 |
| 7,216,926 B2 * | 5/2007 | Hampel | ............... | 296/190.08 |
| 7,255,189 B2 * | 8/2007 | Kurtz et al. | ............... | 180/68.4 |
| 2006/0150595 A1* | 7/2006 | Cuppari et al. | ............... | 55/490 |
| 2008/0151492 A1* | 6/2008 | Maddox | ............... | 361/687 |

FOREIGN PATENT DOCUMENTS
JP    9-316933    * 12/1997

* cited by examiner

*Primary Examiner* — Dennis Pedder

(57) ABSTRACT

A work machine comprises an operator station, a filter door, and a fresh air filter to filter fresh air that flows from outside the operator station into the operator station. The fresh air filter is mounted to the filter door for movement therewith relative to the operator station. An associated method is disclosed.

12 Claims, 10 Drawing Sheets

WORK MACHINE WITH DOOR-MOUNTABLE FRESH AIR FILTER

FIELD OF THE DISCLOSURE

The present disclosure relates to a work machine that has a fresh air filter for use with an operator station.

BACKGROUND OF THE DISCLOSURE

There are work machines having an operator station configurable to provide an enclosed space for an operator of the work machine. Inside the operator station, an operator controls the work machine. To maximize the comfort of the operator, the operator station may be heated, cooled, and ventilated. To accomplish this, the operator station may draw air from outside the operator station through a fresh air filter into the operator station.

Fresh air filters may be serviced from time to time (e.g., weekly) to optimize their performance characteristics. Servicing a fresh air filter may include, for example, cleaning or replacing the fresh air filter.

SUMMARY OF THE DISCLOSURE

According to the present disclosure, the work machine comprises an operator station and a filter door mounted to the operator station for movement relative thereto. The work machine further comprises a fresh air filter to filter fresh air that flows from outside the operator station into the operator station. The fresh air filter is mounted to the filter door for movement therewith relative to the operator station.

According to an aspect of the present disclosure, the operator station comprises a fresh air inlet and is configurable to define an access opening. The filter door is mounted to the operator station for pivotable movement relative to the operator station between a closed position and an opened position. The fresh air filter is mounted to the filter door for movement therewith relative to the operator station. When the filter door is positioned in the closed position, the fresh air filter is positioned to filter fresh air that flows from outside the operator station through the fresh air inlet into the operator station. When the filter door is positioned in the opened position, the fresh air filter is arranged relative to the access opening so as to be accessible outside the operator station through the access opening from inside the operator station. The work machine may also have a latch actuator operable from inside the operator station to unlatch and open the filter door for access to the fresh air filter by the operator.

As such, to service the fresh air filter, an operator located inside the operator station can open the filter door from inside the operator station, reach through the access opening to the fresh air filter (e.g., an opening defined by an opened window of the operator station), and remove the fresh air filter for cleaning or replacement of the fresh air filter. In this way, the operator can remain located inside the operator station and keep the fresh air filter, and the contaminants trapped thereby, outside the operator station while the operator services the fresh air filter. This may be particularly useful with work machines having an elevated operator station, such as knuckleboom log loaders or tower cranes, in which the fresh air filter may be difficult to access from the ground without use of a ladder or other elevation aid.

According to another aspect of the present disclosure, the work machine comprises an operator station, a filter door, and a fresh air filter to filter fresh air that flows from outside the operator station into the operator station. The fresh air filter is mounted to the filter door. The filter door is mounted to the operator station for movement relative thereto so as to be openable toward a window of the operator station for access to the fresh air filter outside the operator station through the window from inside the operator station.

According to yet another aspect of the present disclosure, a method for a work machine is disclosed. The method comprises releasing the filter door, accessing the fresh air filter outside the operator station through the access opening from inside the operator station, and removing the fresh air filter from the filter door.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
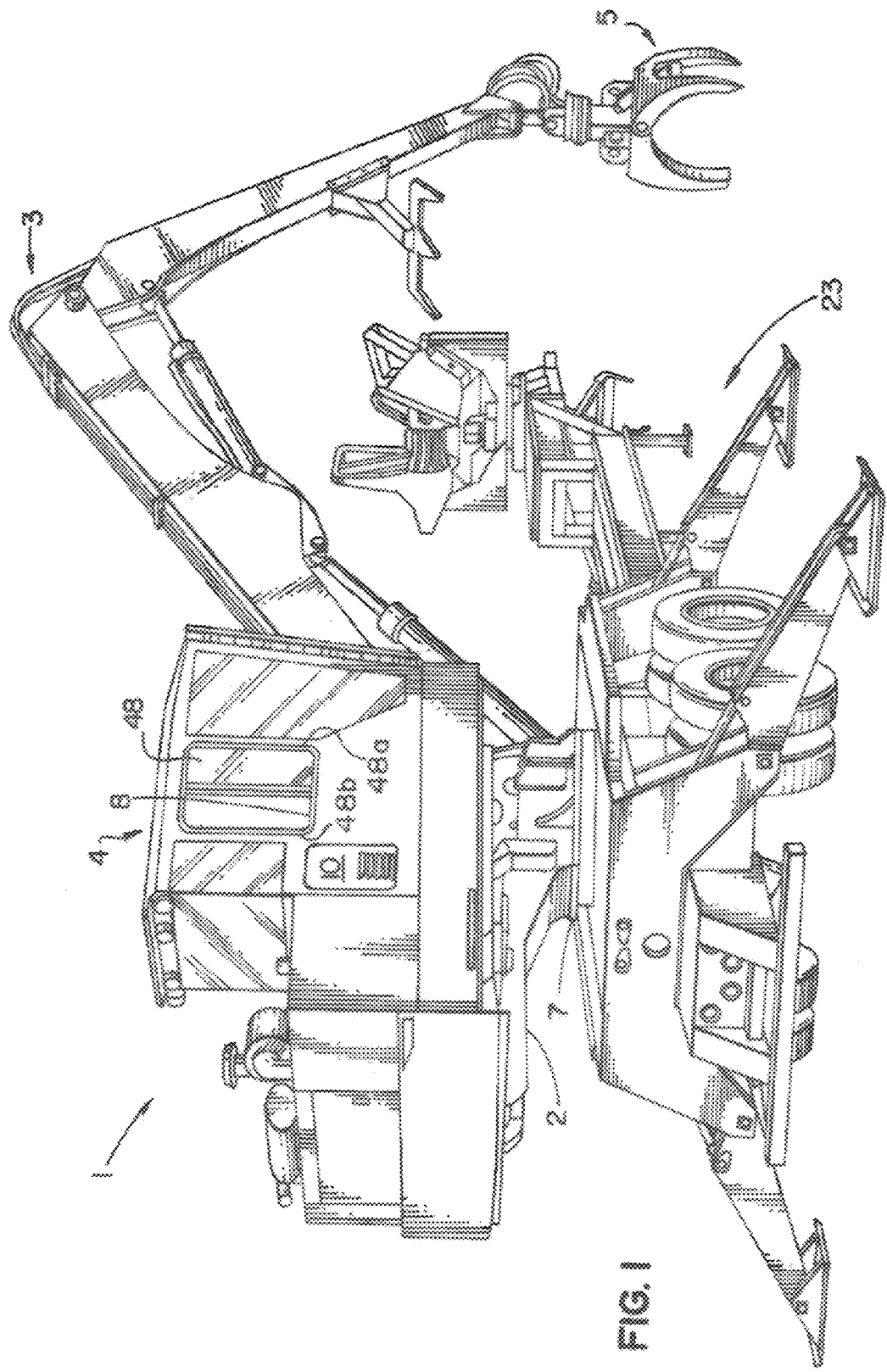
FIG. 1 is a perspective view showing a work machine, in the form of, for example, a knuckleboom log loader, having a filter door mounted to the side of an operator station of the work machine and positioned in a closed position.
Figure 2:
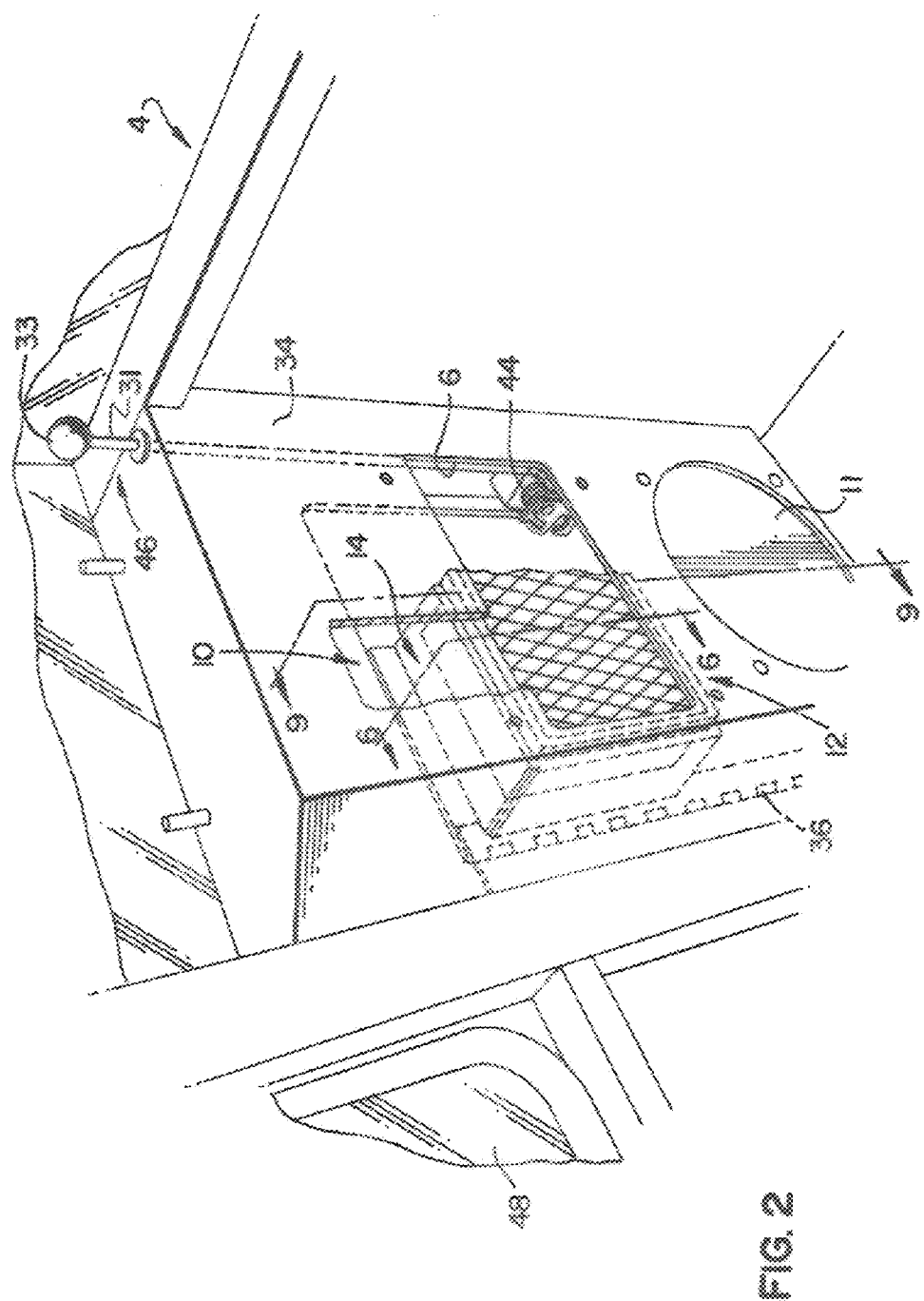
FIG. 2 is an enlarged perspective view from inside the operator station, with portions broken away, showing the filter mounted to the filter door via a filter mount.

Referring to FIG. 1, there is shown a work machine 1. Exemplarily, the work machine 1 is a knuckleboom log loader. An operator station 4 is configured to enclose an operator 9 (see FIG. 3) of the work machine 1. An exterior filter door 10 is mounted to the operator station 4 for pivotable movement relative to the operator station 4 about a vertical pivot axis 90 between a closed position (see FIG. 1) and an opened position (see FIG. 3). The operator station 4 further comprises a window 48 configurable to define an access opening 8.

The operator station 4 is mounted to a support frame 2. The support frame 2 is mounted to a platform 23 via a swing-bearing arrangement 7 for rotation of the operator station 4 about a vertical axis. In this embodiment, the platform 23 is a semi-trailer, but the platform may take other forms as well (e.g., a truck). An articulated boom 3, having inboard and outboard arms articulated to one another, is mounted for rotation with the operator station 2 relative the platform 23 via the swing-bearing arrangement 7. A grapple 5 is attached to the boom 3 (i.e., the outboard arm thereof). The boom 3 and the grapple 5 may be used to load timber onto trucks.

Referring now to FIG. 2 through FIG. 9, there is shown a fresh air filter 12 mounted to the filter door 10 for movement therewith relative to the operator station 4. The fresh air filter 12 filters fresh air that enters the operator station 4, and is positioned in a compartment 30 defined between the filter door 10 and an interior wall 34.

Figure 9:
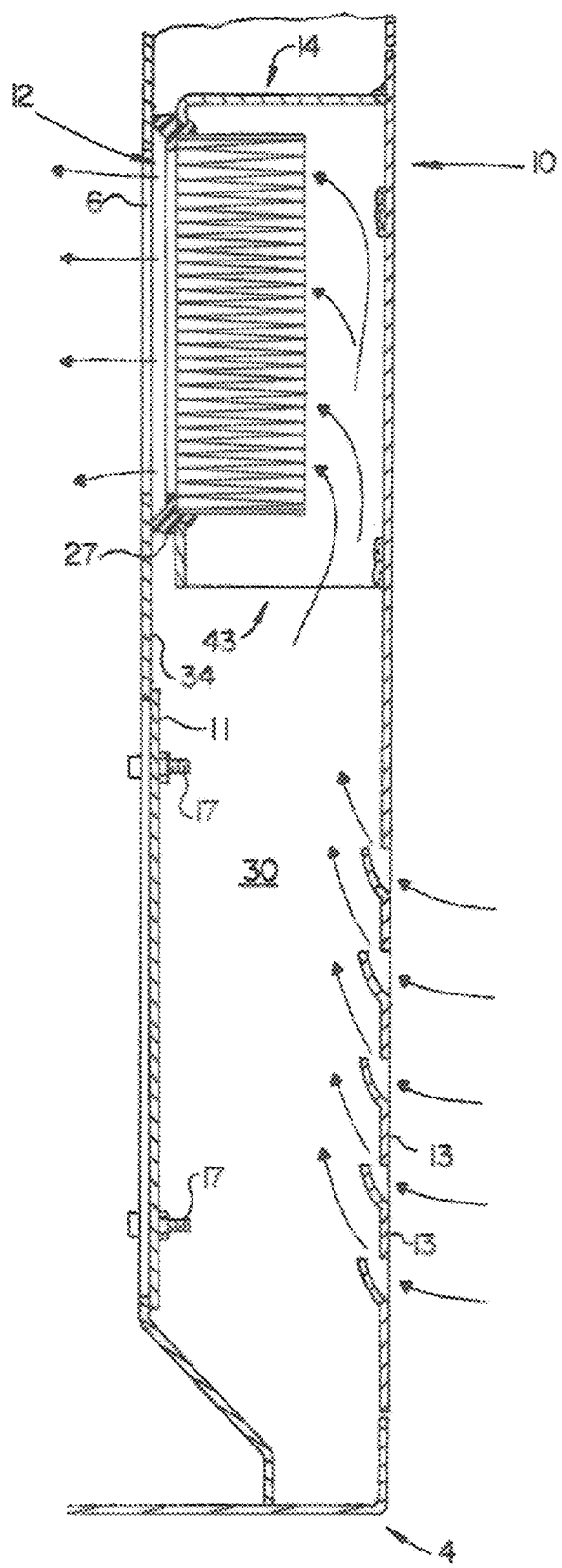
FIG. 9 is a sectional view taken along lines 9-9 of FIG. 2 showing flow of air from outside the operator station through the filter door, the fresh air filter, and the air inlet into the operator station.

As shown, for example, in FIG. 9, the fresh air is drawn by a fan (not shown) of the HVAC system of the machine 1 from outside the operator station 4 through the filter 12 into the operator station 4 when the filter door 10 is positioned in the closed position. The fresh air flows from outside the operator station 4 through interior louvers 13 of the door 10 into the compartment 30 and through the filter 12 and a fresh air inlet 6, defined in the interior wall 34, into a mixing chamber (not shown) included in the HVAC system and positioned within the operator station 4. The fresh air and re-circulated air mix with one another in the mixing chamber for subsequent conditioning, if any, by the HVAC system. The air from the mixing chamber then enters the operator station 4 by operation of the fan (located, for example, in the mixing chamber).

Exemplarily, the louvers 13 of the door 10 are positioned so as to minimize entry of water (e.g., rain water) into the filter 12. The louvers 13 are positioned below the filter 12 and above a compartment drain (not shown) of the compartment 30 for drainage of water that may enter the compartment 30. The louvers 13 are angled upwardly to direct the flow of fresh air toward the filter 12.

Figure 3:
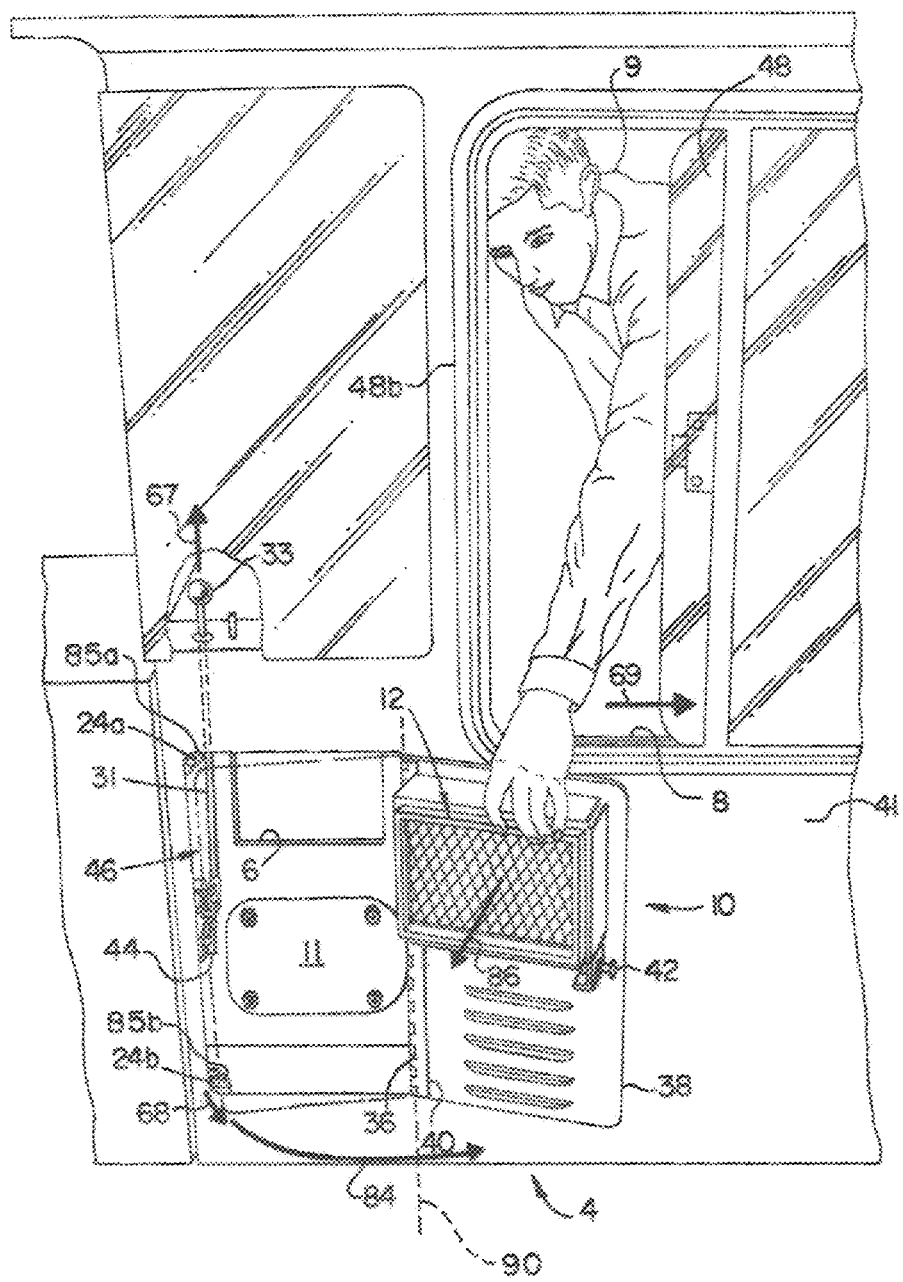
FIG. 3 is a perspective view of the work machine, with portions broken away, showing an operator reaching outside the operator station through an access opening, defined by an opened window, from inside the operator station to the fresh air filter and removing the fresh air filter from the filter mount after having pivoted the filter door first from the closed position to a released position shown in phantom and then to an opened position shown in solid.

As shown, for example, in FIG. 3, the filter door 10 is mounted to the exterior of a side of the operator station 4 via, for example, a hinge 36. Exemplarily, the hinge 36 is a continuous hinge, but the hinge 36 may take other forms as well. The door 10 has first and second side edges 38, 40, and the hinge 36 interconnects the second side edge 40 and an exterior panel 41 of a side of the operator station 4, such that each of the hinge 36 and the second side edge 40 is closer to the access opening 8 than the first side edge 38 when the filter door 10 is positioned in the closed position. The hinge 36 is configured for pivoting of the filter door 10 relative to the operator station 4 about the pivot axis 90 between the closed position and opened position.

As such, the filter door 10 is mounted to the operator station 4 for movement relative thereto so as to be openable toward the window 48 for access to the fresh air filter 12 outside the operator station 4 through the window 48 from inside the operator station 4. Exemplarily, the pivot axis 90 is offset horizontally from the window 48 to promote access to the filter 12 when the door 10 is opened. More particularly, the window 48 has a forward side edge 48a and a rearward side edge 48b, and the pivot axis 90 is rearward of the rearward side edge 48b.

Figure 4:
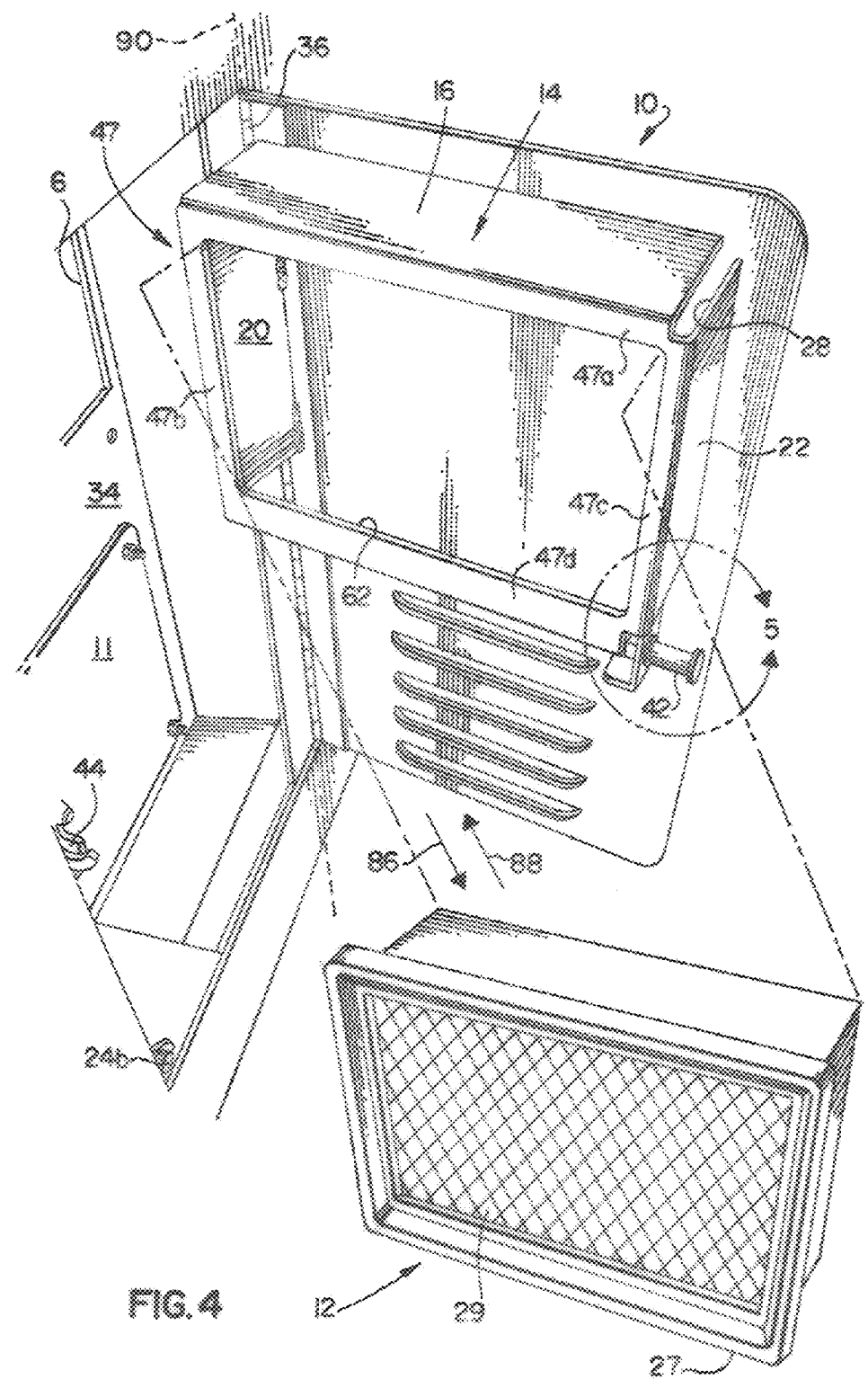
FIG. 4 is an exploded perspective view showing the fresh air filter detached from the filter mount.
Figure 5:
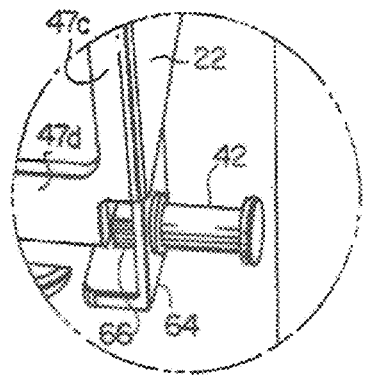
FIG. 5 is an enlarged perspective view showing a striker for engagement with a latch when the filter door is positioned in a closed position.
Figure 7:
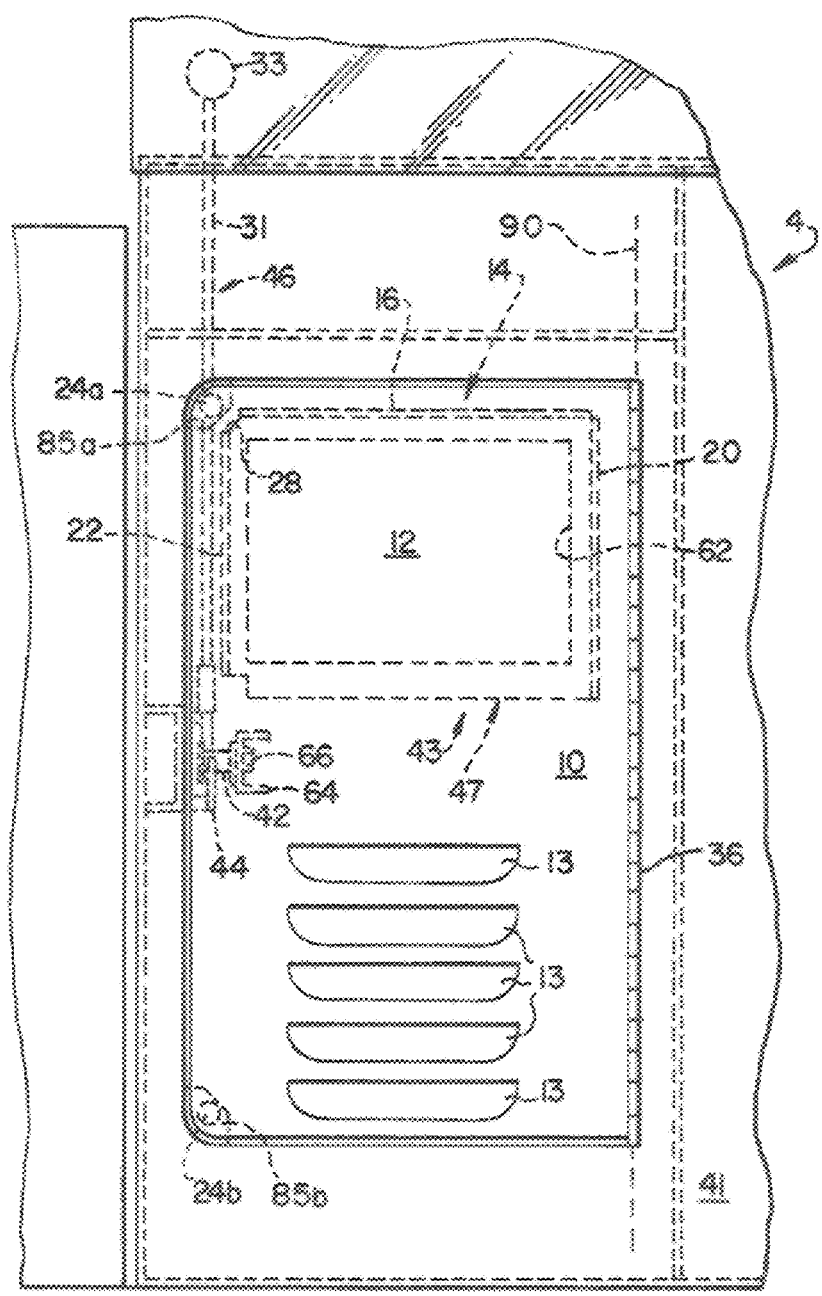
FIG. 7 is an enlarged elevational view showing the filter door as viewed from outside the operator station.
Figure 8:
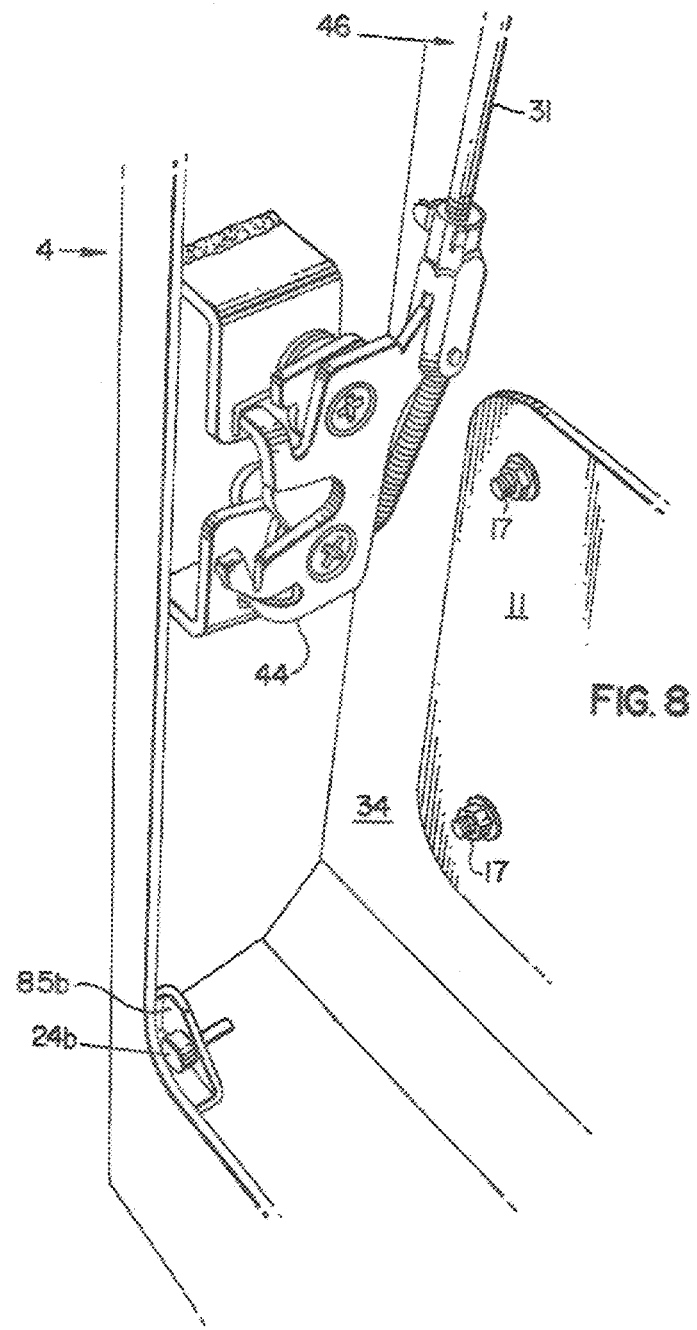
FIG. 8 is a perspective view showing a latch mounted to the operator station and a rod of a latch actuator in communication with the latch.

An exemplary filter mount 14 is fixed to the filter door 10, as shown, for example, in FIGS. 4 and 7. The filter mount 14 has a closed-loop rim 47 to which the fresh air filter 12 is mounted therein, a top wall 16 interconnecting a top segment 47a of the rim 47 and the filter door 10, a first side wall 20 interconnecting a first side segment 47b of the rim 47 and the filter door 10, and a second side wall 22 interconnecting a second side segment 47c of the rim 47 and the filter door 10. The top wall 16, the first side wall 20, and the second side wall 22 extend are fixed to the filter door 10 with welds, for example. A bottom segment 47d of the rim 47 is spaced apart from the filter door to define an opening 43 between the bottom segment 47d and the door 10. The segments 47a, 47b, 47c, 47d are arranged such that the rim 47 is generally rectangular in shape.

The filter mount 14 is formed of, for example, sheet metal. In so forming the mount 14, a piece of sheet metal is cut from a blank to create the rim 47, and three flanges of the blank, extending outwardly from the segments 47a, 47b, 47c, are bent away from the rim 47 to form the walls 16, 20, 22. The walls 16, 20, 22 are then fixed to the interior surface of the door 10 through welding, for example. As such, the rim 47 is configured as a perforated plate.

Exemplarily, the fresh air filter 12 comprises a filter element 29, a gasket 27, and a frame 25. The filter element 29 comprises a block of pleated paper. The frame 25 surrounds the periphery of the filter element 29. The gasket 27 is mounted on the frame 25 therearound and is made of, for example, urethane. An example of the filter 12 is provided by Cummins Filtration Inc. of Stoughton, Wis. and has Deere Part No. AT191102.

The filter 12 is inserted through an opening defined by the rim 47, and a first portion 27a of the gasket 27 is urged into the rim opening 62 such that the filter 12 is mounted to the filter mount 14 via an interference fit between the gasket portion 27a and the rim 47, and its segments 47a, 47b, 47c, 47d, and a sealed connection is established between the filter element 29 and the rim 47, and its segments 47a, 47b, 47c, 47d, by use of the gasket portion 27a. As such, the rim 47 surrounds the filter 12 upon attachment of the filter 12 to the rim 47.

When the filter door 10 is positioned in the closed position, a second portion 27b of the gasket 27 is compressed between a face of the rim 47 and the interior wall 34 so as to establish a sealed connection between the rim 47, including its segments 47a, 47b, 47c, 47d, and the interior wall 34 around the air inlet 6. Such compression further facilitates mounting of the filter 12 to the filter mount 14.

The machine 10 may have a latch mechanism for latching in the door 10 in the closed position. As shown, for example, in FIG. 3, the latch mechanism includes a striker 42 mounted to the filter door 10 via a bracket 64, a latch 44 mounted to the operator station 4 and configured to receive the striker 42, and a latch actuator 46 in communication with the latch 44 to actuate the latch 44. The latch 44 is, for example, a single cam latch positioned in the compartment 30 (see FIG. 8).

Figure 6:
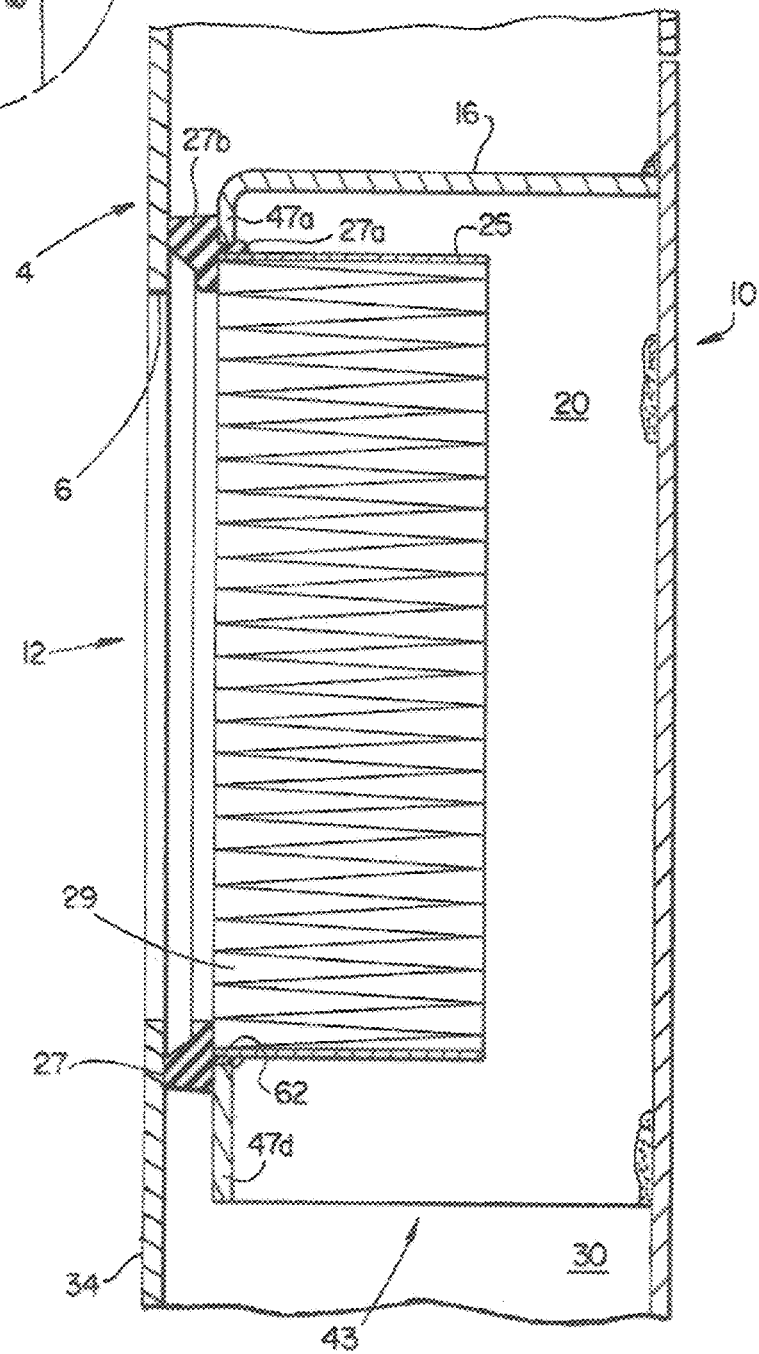
FIG. 6 is a sectional view taken along lines 6-6 of FIG. 2 showing the filter door positioned in the closed position and the fresh air filter mounted to the filter mount and establishing a sealed connection with an interior wall defining a fresh air inlet of the operator station.

The striker 42 is, for example, a striker post, as shown, for example, in FIG. 6. The striker 42 is fastened to the bracket 64. The rear edge of the bracket 64, the rear edge being the edge adjacent to the door, is fixed (e.g., welded) to the filter door 10. A nut 66 is attached to a threaded end of the striker 42 to mount the striker 42 to the bracket 64.

The latch actuator 46 exemplarily comprises an operator interface 33 and a rod 31. The rod 31 extends from the latch 44 into the operator station 4 to the operator interface 33 so as to interconnect the latch 44 and the operator interface 33. The operator interface 33 is positioned in the operator station 4 for ready access by the operator and is configured, for example, as a knob. In other examples, the operator interface 33 may be a handle or other suitable structure for interfacing with the operator to actuate the latch 44. When the operator operates the latch actuator 46, via the operator interface 33, the latch 44 releases the striker 42 and the filter door 10 pivots from the closed position to a released position (shown in phantom in FIG. 3) about the pivot axis 90 via the hinge 36, after which the operator can further pivot the door 10 about the pivot axis 90 via the hinge 36 to its opened position (shown in solid in FIG. 3) to access the filter 12.

As shown, in FIG. 3, the operator station 4 may have a number of door bumper mounts, such as, for example, upper and lower door bumper mounts 85a, 85b. Each door bumper mount 85a, 85b is configured, for example, as a formed plate fixed (e.g., welded) to the panel 41.

As shown, for example, in FIG. 3, the operator station 4 may have a number of door bumpers, such as, for example, upper and lower door bumpers 24a, 24b respectively mounted to the door bumper mounts 85a, 85b. The bumpers 24a, 24b are made of, for example, rubber and are configured to reduce vibration of the door 10.

As shown, for example, in FIG. 4, the top wall 16 and the second side wall 22 cooperate to define a slot 28. As shown, in FIG. 7, the slot 28 is configured to provide a clearance that allows the filter door 10 to be positioned in the closed position without interference between the door bumper mount 85a and the filter mount 14.

The operator station 4 may have an access panel 11, shown, for example, in FIGS. 3 and 9. The access panel 11 is removably mounted to the interior wall 34 with a plurality of fasteners 17 (e.g., bolts). The door 10 may be opened to gain access to the panel 11, at which point the panel 11 may be unfastened and removed from the interior wall 34 for access through an opening, formed in the interior wall 34 and typically covered by the panel 11, to allow access to a fan motor (not shown) of the HVAC system, positioned in the mixing chamber, for preventative maintenance and repairs or other purpose.

Figure 10:
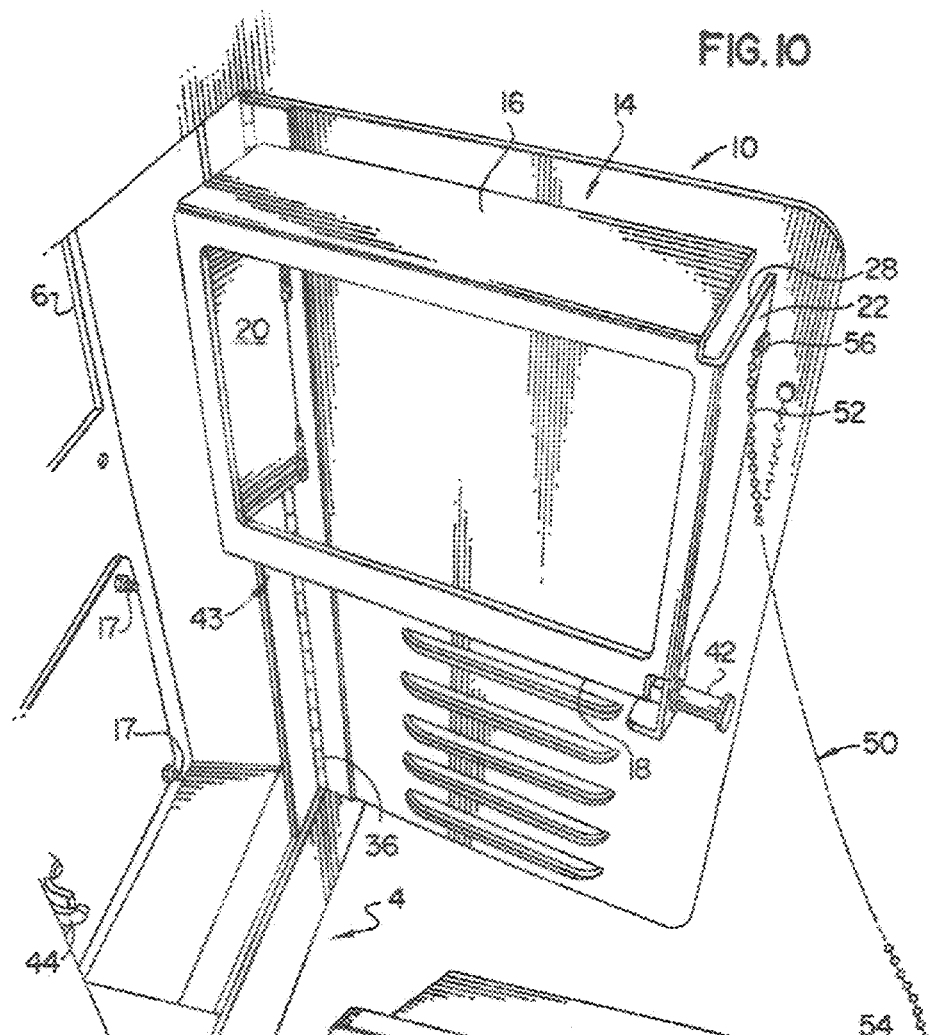
FIG. 10 is an perspective view showing an alternative embodiment having a tether tethering the fresh air filter to the filter mount.

Referring to FIG. 10, in an alternative embodiment, the machine 10 may have a tether 50 configured to tether the filter 12 to the filter mount 14 (in solid in FIG. 10) or the door 10 (in phantom in FIG. 10). The tether 50 has a first end 52 and a second end 54. The first end 52 is attached to the filter mount 14 or the filter door 10, and the second end 54 is attached to the fresh air filter 12. The tether 50 may be used to pull the fresh air filter 12 from the filter mount 14, or the tether 50 may be used to prevent the fresh air filter 12 from falling to the ground during service.

The tether 50 may be, for example, a chain or a cable. The first end 52 may be attached, for example, with a tether fastener 56. The second end 54 may be attached, for example, with a tether tee 58.

Figure 11:
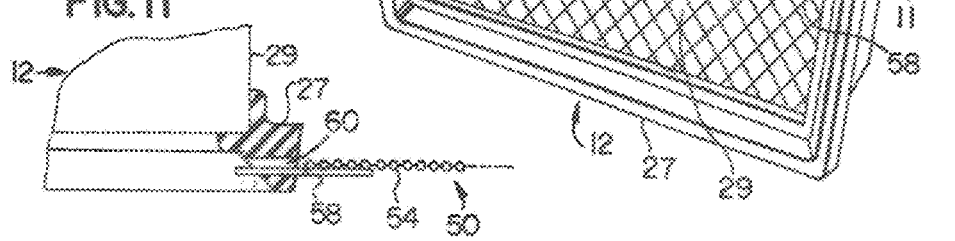
FIG. 11 is a sectional view taken along lines 11-11 of FIG. 10 showing an end of the tether being attached to a gasket of the fresh air filter.

Referring to FIG. 11, the tether tee 58 may be attached, for example, through a bore 60 in the gasket portion 27b of the filter 12. The tether tee 58 allows for ready replacement of the fresh air filter 12 with another fresh air filter.

Figure 12:
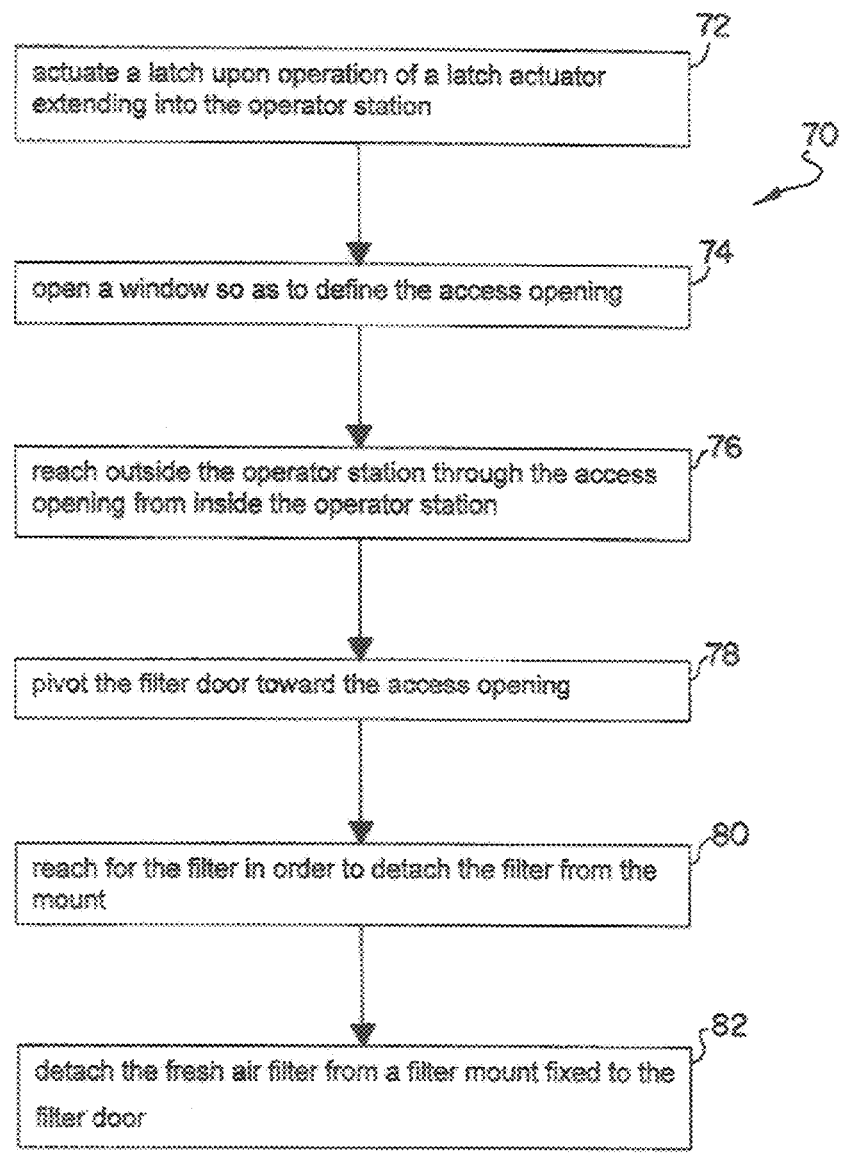
FIG. 12 is a flow chart of a method for servicing the fresh air filter.

Referring to FIG. 12, there is shown a method 70 for servicing the fresh air filter 12, while the operator remains located in the operator station 4. In act 72 of the method 70, from the operator station 4, the operator pulls up on the knob 33 in the direction of arrow 67 to release the door 10 (see FIG. 3). When the operator pulls up on the knob 33, the rod 31 actuates the latch 44 causing the latch 44 to unlatch the striker 42. Once the striker 42 is released, the upper and lower bumpers 24a, 24b, compressively pre-loaded when the door 10 was closed, and a spring of the latch 44 cooperate to urge the striker 42 and the door 10 away from the latch 44 in the direction of arrow 68 to the released position (shown in phantom in FIG. 3). As such, the door 10 pivots about the pivot axis 90 via the hinge 36 in the direction of the arrow 68 from the closed position, in which latch 44 receives the striker 42 so that the door 10 is closed (see FIGS. 1 and 9), to the released position, in which the striker 42 is released and the door 10 is positioned slightly away from the closed positioned exposing the door 10 so that it can be pivoted further by the operator for access to the filter 12.

Afterwards, the operator accesses the filter 12 outside the operator station 4 through the access opening 8 from inside the operator station 4. In particular, in act 74, the operator opens the window 48, in the direction of arrow 69 (see FIG. 3), so as to define the access opening 8. Next, in act 76, the operator reaches outside the operator station 4 through the access opening 8 from inside the operator station 4. In act 78, the operator pivots the door 10 about the pivot axis 90 via the hinge 36 beyond the released position toward the access opening 8 in the direction of arrow 84 to the opened position (shown in solid in FIG. 3). The opened position is pivoted far enough away from the released position so that the operator can gain access to the filter 12. As such, the opened position shown in solid in FIG. 3 is merely illustrative, as the door 10 may be arranged in a variety of opened positions beyond the released position allowing access to the filter 14 by the operator. In act 80, the operator reaches for the filter 12 and makes contacts therewith in order to detach the filter 12 from the mount 14.

In act 82, the operator removes the filter 12 from the door 10. The operator detaches the filter 12 from the mount 14 by detaching the gasket 27 from the rim 47 and pulling the filter element 29 through the rim opening 62 in the direction of arrow 86 (see FIG. 3). At that point, the operator may replace the used filter 12 with a replacement filter 12, or clean the used filter 12 (e.g., tap the used filter 12 against the operator station 4 to remove contaminants from the filter 12) and re-attach it to the mount 14 for further use, as shown by arrow 88 (see FIG. 4).

Thus, when servicing the filter 12, the operator can remain located inside the operator station 4, while the filter 12, with the contaminants trapped thereby, is kept outside the operator station 4. This may be particularly useful with work machines having an elevated operator station, such as knuckleboom log loaders or tower cranes, in which the fresh air filter 12 may be difficult to access from the ground without use of a ladder or other elevation aid. In the illustrated example (see FIG. 1), the operator station 4 of the knuckleboom log loader may be, for example, ten feet from the ground. Further, the operator station of a tower crane may be a considerable height above the ground.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work machine, comprising:
   an operator station, wherein the operator station comprises a fresh air inlet and is configurable to define an access opening;
   a filter door mounted to the operator station for pivotable movement relative to the operator station between a closed position and an opened position;
   a fresh air filter detachably mounted to the filter door for movement therewith relative to the operator station, wherein the fresh air filter is positioned in contact with the operator station to filter fresh air that flows from outside the operator station through the fresh air inlet into the operator station when the filter door is positioned in the closed position and is arranged relative to the access opening so as to be accessible outside the operator station through the access opening from inside the operator station when the filter door is positioned in the opened position, and the fresh air filter is spaced apart from the operator station when the filter door is positioned in the opened position; and
   a filter mount fixed to the filter door, wherein the fresh air filter is mounted to the filter mount, the filter mount comprises a closed-loop rim to which the fresh air filter is mounted therein, a top wall interconnecting a top segment of the rim and the filter door, a first side wall interconnecting a first side segment of the rim and the filter door, and a second side wall interconnecting a second side segment of the rim and the filter door, and a bottom segment of the rim is spaced apart from the filter door to define an opening therebetween.

2. The work machine of claim 1, comprising a door bumper mount attached to the operator station and a door bumper mounted to the door bumper mount, wherein the top wall and the first side wall cooperate to define a slot configured to provide a clearance for the door bumper mount when the filter door is positioned in the closed position.

3. The work machine of claim 1, comprising:
   a hinge, wherein the filter door comprises a first side edge and a second side edge, and the hinge interconnects the second side edge and the operator station and is closer to the access opening than the first side edge when the filter door is positioned in the closed position;
   a striker mounted to the filter door;
   a latch mounted to the operator station and configured to receive the striker; and
   a latch actuator in communication with the latch and extending into an operator compartment;
   wherein the operator station comprises a window configurable to define the access opening.

4. The work machine of claim 1, comprising a hinge, wherein the filter door comprises a first side edge and a second side edge, and the hinge interconnects the second side edge and the operator station and is closer to the access opening than the first side edge when the filter door is positioned in the closed position.

5. The work machine of claim 1, comprising:
   a striker mounted to the filter door;
   a latch mounted to the operator station and configured to receive the striker; and
   a latch actuator in communication with the latch and extending into an operator compartment.

6. The work machine of claim 1, wherein the operator station comprises a window configurable to define the access opening.

7. The work machine of claim 1, comprising a filter mount and a tether, wherein the filter mount is fixed to the filter door, and the tether is attached to the filter mount or the filter door and attached to the fresh air filter.

8. The work machine of claim 1, wherein the work machine is a knuckleboom log loader.

9. A work machine, comprising:
   an operator station comprising a window;
   a filter door;
   a fresh air filter to filter fresh air that flows from outside the operator station into the operator station, the fresh air filter detachably mounted to the filter door, the fresh air filter positioned in contact with the operator station when the filter door is positioned in a closed position relative to the operator station, the filter door mounted to the operator station for movement relative thereto so as to be openable toward the window for access to the fresh air filter outside the operator station through the window from inside the operator station, and the fresh air filter is spaced apart from the operator station when the filter door is positioned in an opened position relative to the operator station; and
   a filter mount fixed to the filter door, wherein the fresh air filter is mounted to the filter mount, the filter mount comprises a closed-loop rim to which the fresh air filter is mounted therein, a top wall interconnecting a top segment of the rim and the filter door, a first side wall interconnecting a first side segment of the rim and the filter door, and a second side wall interconnecting a second side segment of the rim and the filter door, and a bottom segment of the rim is spaced apart from the filter door to define an opening therebetween.

10. The work machine of claim 9, wherein the filter door is mounted to the operator station for pivotable movement relative thereto about a vertical pivot axis offset horizontally from the window.

11. The work machine of claim 10, wherein the window comprises a forward side edge and a rearward side edge, and the pivot axis is rearward of the rearward side edge.

12. The work machine of claim 9, comprising:
   a hinge, wherein the filter door comprises a first side edge and a second side edge, and the hinge interconnects the second side edge and the operator station and is closer to the window than the first side edge when the filter door is positioned in the closed position relative to the operator station;
   a striker mounted to the filter door;
   a latch mounted to the operator station and configured to receive the striker; and
   a latch actuator in communication with the latch and extending into an operator compartment.

* * * * *